(12) United States Patent
Chelian et al.

(10) Patent No.: US 9,002,098 B1
(45) Date of Patent: Apr. 7, 2015

(54) ROBOTIC VISUAL PERCEPTION SYSTEM

(71) Applicant: HRL Laboratories, LLC, Malibu, CA (US)

(72) Inventors: Suhas E. Chelian, Encino, CA (US); Rashmi N. Sundareswara, Los Angeles, CA (US); Heiko Hoffmann, Simi Valley, CA (US)

(73) Assignee: HRL Laboratories, LLC, Malibu, CA (US)

( * ) Notice: Subject to any disclaimer, the term of this patent is extended or adjusted under 35 U.S.C. 154(b) by 287 days.

(21) Appl. No.: 13/721,007

(22) Filed: Dec. 19, 2012

Related U.S. Application Data

(60) Provisional application No. 61/590,689, filed on Jan. 25, 2012.

(51) Int. Cl.
*G06K 9/62* (2006.01)
*G06T 1/00* (2006.01)

(52) U.S. Cl.
CPC .............. *G06T 1/0014* (2013.01); *Y10S 901/47* (2013.01)

(58) Field of Classification Search
None
See application file for complete search history.

(56) References Cited

U.S. PATENT DOCUMENTS

| | | | | |
|---|---|---|---|---|
| 4,876,728 | A * | 10/1989 | Roth .............................. | 382/153 |
| 2005/0286767 | A1 * | 12/2005 | Hager et al. ................... | 382/190 |
| 2009/0116728 | A1 * | 5/2009 | Agrawal et al. ................ | 382/154 |

OTHER PUBLICATIONS

Bay, Tuyletaars and Gool, Luv Van, SURF: Speeded-Up Robust Features, ECCV, 2006.
S. Belongie and J. Malik, Matching with Shape Contexts. IEEE Workshop on Content-based Access of Image and Video Libraries, 2000.
P. J. Besl and N. D. McKay, A method for registration of 3-d shapes, IEEE Trans. Pat. Anal. and Mach. Intet, vol. 14, No. 2, Feb. 1992.
Jin-Long Chen, George C. Stockman, Determining Pose of 3D Objects With Curved Surfaces, IEEE Transactors on Pattern Analysis and Machine Integigence, vol. 18, No. 1, pp. 52-57, Jan. 1996.
Conte, D. Foggia, P. Sansone, C Vento, M., Thirty Years of Graph Matching in Pattern Recognition, International Jounal of Pattern Recognition and Artificial Intelligence, vol. 18, No. 3, pp. 265-298, 2004.
T.F. Cootes, G.J. Edwards and C.J.Taylor. Active Appearance Models IEEE PAMI, vol. 23, No. 6. pp. 681-685, 2001.

(Continued)

*Primary Examiner* — Brian P Werner
(74) *Attorney, Agent, or Firm* — Tope-McKay & Associates

(57) ABSTRACT

Described is a robotic visual perception system for determining a position and pose of a three-dimensional object. The system receives an external input to select an object of interest. The system also receives visual input from a sensor of a robotic controller that senses the object of interest. Rotation-invariant shape features and appearance are extracted from the sensed object of interest and a set of object templates. A match is identified between the sensed object of interest and an object template using shape features. The match between the sensed object of interest and the object template is confirmed using appearance features. The sensed object is then identified, and a three-dimensional pose of the sensed object of interest is determined. Based on the determined three-dimensional pose of the sensed object, the robotic controller is used to grasp and manipulate the sensed object of interest.

18 Claims, 6 Drawing Sheets

(56) References Cited

OTHER PUBLICATIONS

L. Fei.-Fei. R. Fergus and P. Perona, Learning generative visual models from few training examples: an incremental Bayesian approach tested on 101 object categories, in Proc. IEEE CVPR, 2004.

Fischler, M. A. and Bolles, R. C. 1981. Random sample consensus: a paradigm for model fitting with applications to image analysis and automated cartography. Graphics and Image Processing, vol. 24, No. 6, 1981.

S. Gold and A. Rangarajan, A Graduated Assignment Algorithm for Graph Matching, IEEE Trans. Pattern Analysis and Machine Intelligence vol. 18, pp. 377-387, Apr. 1996.

R.M. Harlick and L.G. Shapiro, Image Segmentation Techniques, Computer Vision Graphics, Image Processing, vol. 29. pp. 1(10-132, 1985.

S Hart, S Sen, and, R Grupen, Generalization and transfer in robot control, Proceedings of the Eighth International Conference on Epigenetic Robotics, University of Sussex Brighton, UK, 2008.

Hoffmann H, Schenck W, Moller R (2005) Learning visuomotor Transformations for gaze-control and grasping. Biological Cybernetics 93(2): 119-130.

Heiko Hoffmann and Stephan Schaal. Human movement generation based on convergent flow fields: A computational model and a behavioral experiment. Advances in Computational Motor VI. Symposium at the Society for Neuroscience Meeting, San Deigo, 2007.

L. Itti, C. Koch, Computational Modeling of Visual Attention, Nature Reviews Neuroscience, vol, 2, No. 3, pp. 194-203, Mar. 2001.

Andrew Johnson and Martial Hebert, Using spin images for efficient object recognition in cluttered 3D scenes, IEEE Transactions on Pattern Analysis and Machine Intelligence, vol. 21, No. 5, May, 1999, pp. 433-449.

Kemp, C.C. and Edsinger, A. Robot manipulation of human tools: Autonomous detection and control of task relevant features. 5th IEEE International Conference on Development and Learning, 2006.

Raghu Krishnapuram, Swarup Medasani, Sung-Hwan Jung, YoungSik Choi, Rajesh Balasubramaniam, Content-Based Image Retrieval Based on a Fuzzy Approach, IEEE Trans, Knowl. Data Eng., vol. 16, No. 10, Oct. 2004.

Y. LeCun, F.-J. Huang, and L. Bottou, Learning Methods for Generic Object Recognition with Invariance to Pose and Lighting, CVPR 2004.

V. Lepetit and P. Fua, Monocular Model-Based 3D Tracking of Rigid Objects: A Survey, Foundations and Trends in Computer Graphics and Vision, vol. 1, Nr. 1, pp. 1-89, Oct. 2005.

Lowe, David. Distinctive Image Features from Scale-Invariant Keypoints. International Journal of Computer Vision, (60), 2004, 91-110, 2004.

D. Martin, C. Fowlkes, J Malik. Learning to Detect Natural Image Boundaries Using Local Brightness, Color and Texture Cues, TPAMI 26 (5). 2004.

S. Medasani, R. Krishnapuram and Y. S. Choi, Graph matching by relaxation of fuzzy assignments, IEEE Trans. Fuzzy Systems, vol. 9, No. 1, Feb. 2001.

Owechko, Yuri, Medasani, S, and Korah, Thommen. Automatic Recognition of Diverse 3-D Objects and Analysis of Large Urban Scenes Using Ground and Aerial LIDAR Sensors. Conference on Lasers and Electro-Optics, San Jose. CA, May 16, 2010.

P. F. Muir ad C. P. Neuman, Kinematic Modeling of wheeled mobile robots, J. of Robotic Systems, vol. 4, No. 2, pp. 281-340, 1987.

Osada, Funkhouser, Chazelle and Dobkin, Matching 3D Models with shape distributions, Shape Modeling International, May 2001.

Y. Owechko, S. Medasani, and N. Srinivasa, Classifier Swarms for Human Detection in Infared Imagery, IEEE Conference on Computer Vision and Pattern Recognition, Washington, D.C., 2004.

Owechko, Yuri, Medasani, S, and Korah, Thommen. Automatic Recognition of Diverse 3-D Objects and Analysis of Large Urban Scenes Using Ground and Aerial LIDAR Sensors. Conference on Lasers and Electro-Optics, San Jose, CA, May 16, 2010.

Kari Pulli and Linda Shapiro. Triplet-Based Obiect Recognition Using Synthetic and Real Probability Models. International Conference on Pattern Recognition (ICPR), Wien, Austria, Aug. 1996.

Lawrence R. Rabiner. A tutorial on Hidden Markov Models and selected applications in speech recogniton, Proceedings of the IEEE 77 (2): 257-286, Feb. 1989.

Rusinkiewicz, S. and Levoy, M. Efficient variant of the ICP algorithm. Proceedings of 3-D Digital imaging and Modelling (3DIM), 2001.

Ashutosh Saxena, Justin Driemeyer, Andrew Y. Ng., "Robotic Grasping of Novel Objects using Vision," International Journal of Robotics Research (IJRR), vol. 27, No. 2, pp. 157-173, Feb. 2006.

T. Serre, L. Wolf and T. Poggio, Object Recognition with Features inspired by Visual Cortex, CVPR 2005.

J. A. Sethian, Fast Marching Methods. SIAM Review, vol. 41, No. 2, pp. 190-235, 1999.

L. Shapiro and R.M. Haralick, A Metric for Comparing Relational Descriptions, IEEE Trans. Pattern Analysis and Machine Intelligence, vol. 7, pp. 90-94, 1985.

Shelton, C. R.: Morphable surface models, Int. J. Comput Vision 38, 1 (2000), 75-91.

Jianbo Shi and Jitendra Malik. Normalized Cuts and Image Segmentation. IEEE Transactions on Pattern Analysis and Machine Intelligence. 1997. vol: 27, 888-905.

W. Sorensen and H. Cline, Marching Cubes: A High Resolution Surface Reconstruction Algorithm, Computer Graphics 21(4) (SIGGRAPH Proceedings, 1987), Jul. 1987. pp. 163-169.

Srinivasa, N., Bhattacharyya, R., Sundareswara, R., Lee, C., and S. Grossberg. A bio-inspired kinematic controller for obstacle avoidance during reaching tasks with real robots. Neural Networks, 35: 54-69, 2012.

Taubin, G. 1991, Estimation of Planar Curves, Surfaces, and Nonplanar Space Curves Defined by Implicit Equations with Applications to Edge and Range Image Segmentation, IEEE Trans. Pattern Anal. Mach. Intell. 13, 11, pp. 1115-1138, Nov. 1991.

Roger Y. Tsai, A versatile Camera Calibration Technique for High-Accuracy 3D Machine Vision Metrology Using Off-the-Shelf TV Cameras and Lenses, IEEE Journal of Robotics and Automation, vol. RA-3, No. 4, pp. 323-344, Aug. 1987.

H. Zhang, A. Berg, M. Maire, and J. Malik, SVM-KNN: Discriminative Nearest Neighbor Classification for Visual Category Recognition, in CVPR, 2006.

H. Zhang, A. Sheffer, D. Cohen-Or, Q. Zhou, O. van Kaick, and A. Tagliasacchi, Deformation Driven Shape correspondence, Eurographics Symposium on Geometry Processing, vol. 27, No. 5. 2008.

Ankerst, M., Kastenmuller, G., Kriegel, H.P., Seidl, T 3D shape histograms for similarity search end classification in spatial databases,. In: Proc. SSD, 1999.

Loh, W-Y. Classification and regression trees. Data mining and knowledge discovery, 1 (1), 2011, 14-23.

Bennett, Kristin P. and Campbell, Colin. Support Vector Machines: Hype or Hallelujah?, SIGKDD Explorations, 2, 2, 2000, 1-13.

Zhang, Zhengyou (1994). "Iterative point for registration of freeform curves and surfaces", International Journal of Computer Vision (Springer) 13 (13): 119-152.

T. Korah, S. Medasani, Y. Owechko, "Automatic Recognition of Diverse 3-D Objects and Analysis or Large Urban Scenes Using Ground and Aerial LIDAR Sensors," 2010 IEEE.

* cited by examiner

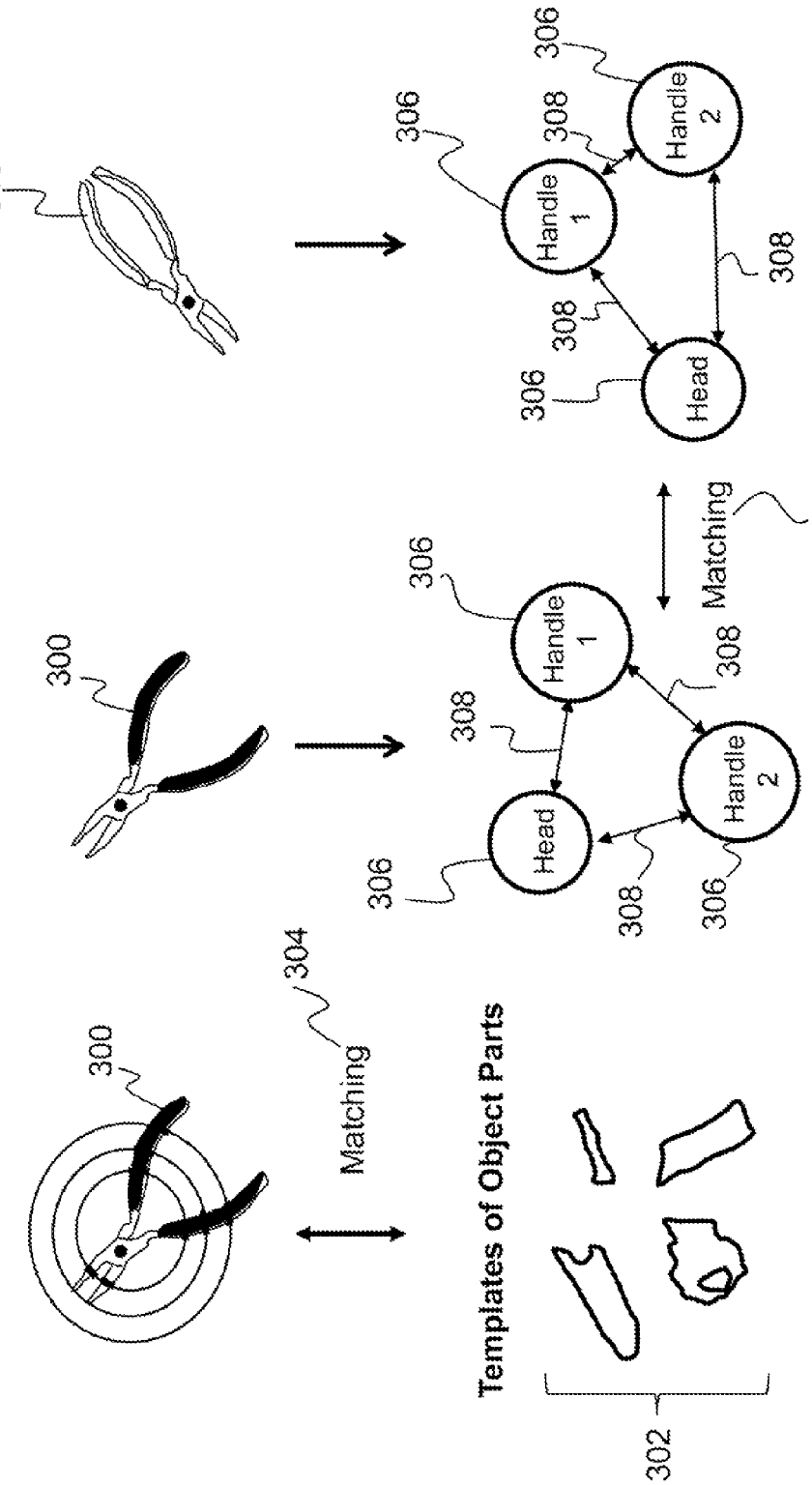

ROBOTIC VISUAL PERCEPTION SYSTEM

CROSS-REFERENCE TO RELATED APPLICATIONS

This is a Non-Provisional patent application of U.S. Provisional Application No. 61/590,689, filed in the United States on Jan. 25, 2012, titled, "Robotic Visual Perception System."

BACKGROUND OF THE INVENTION (1) Field of Invention

The present invention relates to a visual perception system for determining position and pose of a three-dimensional object and, more particularly, to a visual perception system for determining a position and pose of a three-dimensional object through matching with flexible object templates.

(2) Description of Related Art

Robotic sensing is a branch of robotics science intended to give robots sensing capabilities in order to perform specific actions. Robotic sensing primarily gives robots the ability to see, touch, hear, and move using processes that require environmental feedback. Visual perception for allowing a robot to grasp and manipulate a desired object requires segmenting a scene, object identification, localization and tracking of action points.

Appearance-based methods segment scenes based on similar texture and/or color (see List of Cited Literature References, Literature Reference Nos. 10, 14, 22, and 35). These approaches are quick and can work with a single camera, since they do not require depth information. However, they require texture-free backgrounds. Shape-based methods are generally indifferent to visual textures (see Literature Reference Nos. 32 and 36). These systems use mesh grids that are generated from a three-dimensional (3D) data source. This generation requires considerable processing time and suffers from object-class ambiguity of neighboring points.

Additionally, appearance-based methods have been used for object identification (see Literature Reference Nos. 2, 6, 19, 21, 31, and 39). These approaches can operate with only a single camera, but can be thrown off by large changes in lighting or 3D pose. Shape-based methods have been also used for object identification (see Literature Reference Nos. 15 and 25). These approaches are indifferent to visual textures, but can be thrown off by similarly shaped, but differently appearing objects (e.g. a knife versus a screwdriver).

Further, graph matching methods can recognize object parts (see Literature Reference Nos. 9, 18, and 33). These methods scale to multi-part and articulated objects, but typically rely on appearance features only and are computationally expensive. Rigid- (and piece-wise rigid-) body transforms (see Literature Reference Nos. 8, 20, and 38), which are commonly used for well-modeled objects, provide precise pose estimates, but cannot handle deformable or previously unseen objects of a known class. Moreover, through search or learning, grasp points have been computed directly from image features (see Literature Reference No. 30). This approach can handle novel objects, but is sensitive to scene lighting and irrelevant background textures. Deformation mapping (see Literature Reference Nos. 34 and 40) can handle deformable objects, but do not scale well for large number of feature correspondences or handle articulated objects. Kemp and Edsinger find tool tips through fast moving edges when the robot moves the tool (see Literature Reference No. 16). However, this approach is restricted to finding tips of objects.

Each of the aforementioned methods exhibit limitations that make them incomplete. Thus, there is a continuing need for a robotic visual perception system that provides increased levels of autonomy, robustness to uncertainty, adaptability, and versatility.

SUMMARY OF THE INVENTION

The present invention relates to a visual perception system for determining a position and pose of a three-dimensional object through matching with flexible object templates. The system comprises one or more processors and a memory having instructions such that when the instructions are executed, the one or more processors perform multiple operations. The system receives visual input from a sensor of a robotic controller that senses an object of interest. Rotation-invariant shape features are extracted from the sensed object of interest and a set of object templates. A match is identified between the sensed object of interest and an object template using shape features. The match between the sensed object of interest and the object template is confirmed using appearance features. The sensed object is then identified, and a three-dimensional pose of the sensed object of interest is determined. Based on the determined three-dimensional pose of the sensed object, the robotic controller is used to handle the sensed object of interest.

In another aspect, the set of object templates is augmented with a set of action points, wherein the action points represent at least a portion of the sensed object that can be handled by the robotic controller. After identifying the match, the set of action points are transformed into a set of real-world coordinates to guide the robotic controller in handling the sensed object.

In another aspect, a center of the sensed object of interest is determined. A nested sequence of shapes is constructed around the center of the sensed object of interest. Intersection data related to intersections between the sensed object of interest and the nested sequence of shapes is computed, and the plurality of rotation-invariant features is computed from the sensed object based on the intersection data.

In another aspect, appearance features from the set of object templates are computed, wherein the appearance features are obtained from real-world training objects presented in various poses. Appearance features from the sensed object of interest are computed, wherein the appearance features from the sensed object of interest comprise local feature descriptors.

In another aspect, the plurality of rotation-invariant shape features and appearance features from the sensed object of interest and the plurality of rotation-invariant shape features and appearance features from the set of object templates are used to determine a match between the object of interest and an object template.

In another aspect, a graph representing the sensed object of interest is constructed, wherein the sensed object of interest comprises a plurality of object parts. In this aspect, the set of object templates is a set of templates of object parts. The graph comprises a plurality of nodes and edges connecting the plurality of nodes, wherein each node represents an object part of the sensed object and each edge represents a spatial relation between at least two object parts of the sensed object. The plurality of object parts is matched with the set of templates of object parts.

As can be appreciated by one in the art, the present invention also comprises a method for causing a processor to perform the operations described herein.

Finally, the present invention also comprises a computer program product comprising computer-readable instruction means stored on a non-transitory computer-readable medium that are executable by a computer having a processor for causing the processor to perform the operations described herein.

BRIEF DESCRIPTION OF THE DRAWINGS

The objects, features and advantages of the present invention will be apparent from the following detailed descriptions of the various aspects of the invention in conjunction with reference to the following drawings, where:

FIG. 3A illustrates a process of identifying articulated objects from templates of object parts according to the present invention;

FIG. 3B illustrates a graph comprising nodes and edges, where the nodes represent parts of an object and the edges represent spatial relations between the parts of the object according to the present invention;

FIG. 3C illustrates a process of matching similar objects having different part arrangements using a combination of graph and piece-wise rigid-body mapping according to the present invention;

DETAILED DESCRIPTION

Figure 1:
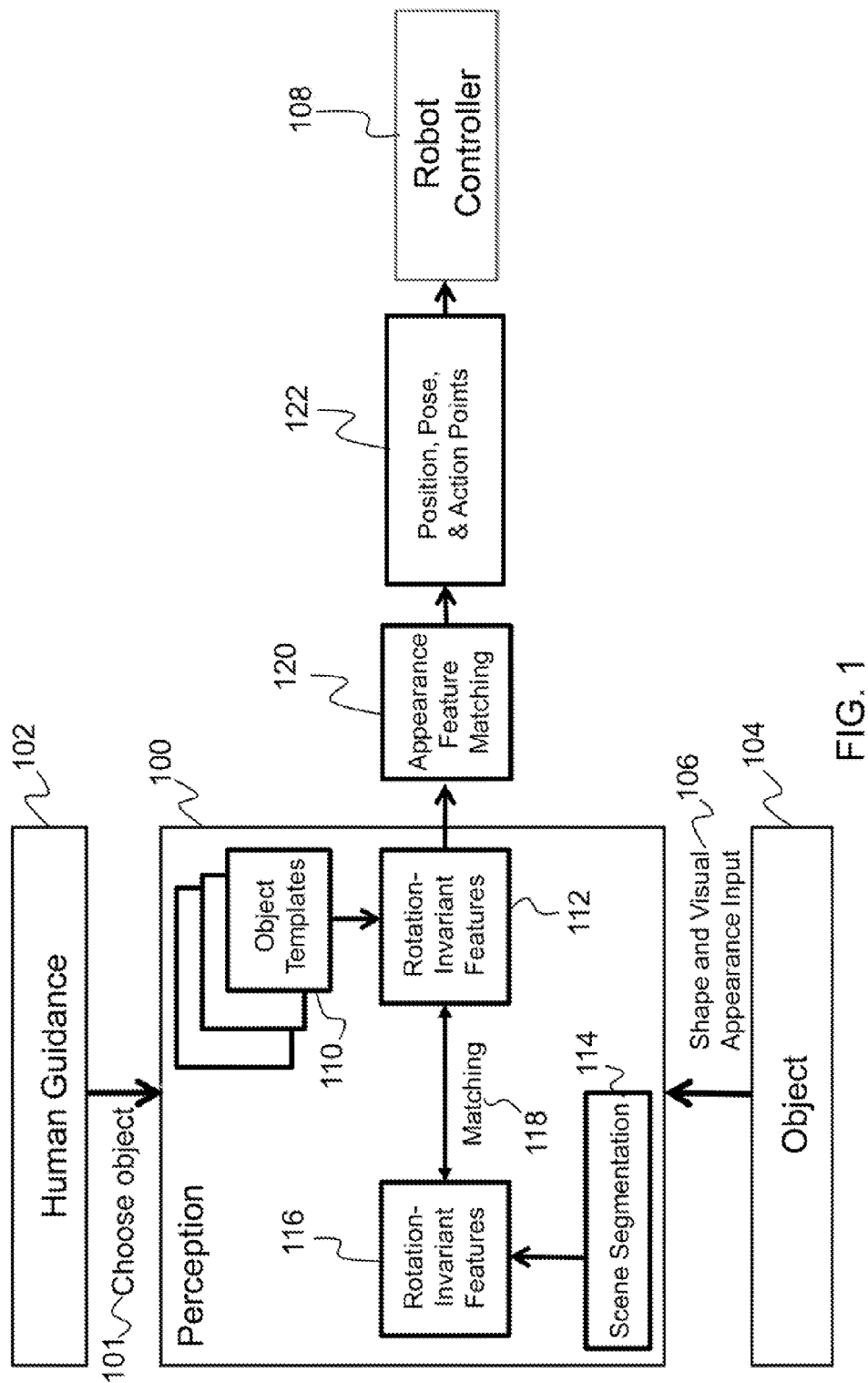
FIG. 1 is a flow diagram illustrating a visual perception system according to the present invention.

The present invention relates to a visual perception system for determining a position and pose of a three-dimensional object and, more particularly, to a visual perception system for determining a position and pose of a three-dimensional object through matching with flexible object templates. The following description is presented to enable one of ordinary skill in the art to make and use the invention and to incorporate it in the context of particular applications. Various modifications, as well as a variety of uses, in different applications will be readily apparent to those skilled in the art, and the general principles defined herein may be applied to a wide range of embodiments. Thus, the present invention is not intended to be limited to the embodiments presented, but is to be accorded with the widest scope consistent with the principles and novel features disclosed herein.

In the following detailed description, numerous specific details are set forth in order to provide a more thorough understanding, of the present invention. However, it will be apparent to one skilled in the in that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent, or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Please note, if used, the labels left, right, front, back, top, bottom, forward, reverse, clockwise and counter-clockwise have been used for convenience purposes only and are not intended to imply any particular fixed direction. Instead, they are used to reflect relative locations and/or directions between various portions of an object. As such, as the present invention is changed, the above labels may change their orientation.

Before describing the invention in detail, first a list of cited literature references used in the description is provided. Subsequently, a description of various principal aspects of the present invention is provided. Finally, specific details of the present invention are provided to give an understanding of the specific aspects.

(1) LIST OF CITED LITERATURE REFERENCES

The following references are cited throughout this application. For clarity and convenience, the references are listed herein as a central resource for the reader. The following references are hereby incorporated by reference as though fully included herein. The references are cited in the application by referring to the corresponding literature reference number.

1. Bay, Tuyletaars and Gool, Luv Van, SURF: Speeded-Up Robust Features, ECCV, 2006.
2. S. Belongie and J. Malik, Matching with Shape Contexts. IEEE Workshop on Content-based Access of Image and Video Libraries, 2000.
3. P. J. Besl and N. D. McKay, A method for registration of 3-d shapes, IEEE Trans. Pat. Anal. and Mach. Intel., Vol 14, No. 2, February 1992.
4. Jin-Long Cheri, George C. Stockman, Determining Pose of 3D Objects With Curved Surfaces, IEEE Transactions on Pattern Analysis and Machine Intelligence, vol. 18, no. 1, pp. 52-57. January 1996.
5. Conte, D. Foggia, P. Sansone, C. Vento, M., Thirty Years of Graph Matching in Pattern Recognition, International Journal of Pattern Recognition and Artificial Intelligence, Vol. 18, No. 3, pp. 265-298, 2004.
6. T. F. Cootes, G. J. Edwards and C. J. Taylor. Active Appearance Models, IEEE PAMI, Vol. 23, No. 6, pp. 681-685, 2001.

7. L. Fei-Fei, R. Fergus, and P. Perona, Learning generative visual models from few training examples: an incremental Bayesian approach tested on 101 object categories, in Proc. IEEE CVPR, 2004.
8. Fischler, M. A. and Bolles, R. C. 1981. Random sample consensus: a paradigm for model fitting with applications to image analysis and automated cartography. Graphics and Image Processing, Vol. 24, No. 6, 1981.
9, S. Gold and A. Rangarajan, A Graduated Assignment Algorithm for Graph Matching, IEEE Trans. Pattern Analysis and Machine Intelligence, vol. 18, pp. 377-387, April, 1996.
10. R. M. Harlick and L. G. Shapiro, image Segmentation Techniques, Computer Vision Graphics, Image Processing, V01.29. PP. I(10-132, 1985.
11. S Hart, S Sen, and R Grupen. Generalization and transfer in robot control. Proceedings of the Eighth International Conference on Epigenetic Robotics, University of Sussex, Brighton, UK, 2008,
12. Hoffmann H. Schenck W, Möller R. (2005) Learning visuomotor transformations for gaze-control and grasping. Biological Cybernetics 93(2):119-130.
13. Heiko Hoffmann and Stefan Schaal. Human movement generation based on convergent flow fields: A computational model and a behavioral experiment. Advances in Computational Motor Control VI, Symposium at the Society for Neuroscience Meeting, San Diego, 2007.
14. L. Itti, C. Koch, Computational Modeling of Visual Attention, Nature Reviews Neuroscience, Vol. 2, No. 3, pp. 194-203. March 2001.
15. Andrew Johnson and Martial Hebert, Using spin images for efficient object recognition in cluttered 3D scenes, IEEE Transactions on Pattern Analysis and Machine Intelligence, Vol. 21, No. 5, May, 1999, pp, 433-449.
16. Kemp, C. C. and Edsinger, A. Robot manipulation of human tools: Autonomous detection and control of task relevant features. 5th IEEE International Conference on Development and Learning, 2006.
17. T. Korah, S. Medasani, Y. Owechko. U.S. patent application Ser. No. 12/644,349, filed on Dec. 22, 2009, entitled, "Strip Histogram Grid for Efficient Segmentation of 3D Pointclouds from Urban Environments."
18. Raghu Krishnapuram, Swamp Medasani, Sung-Hwan Jung, YoungSik Choi Rajesh Balasubramaniam, Content-Based Image Retrieval Based on a Fuzzy Approach, IEEE Trans. Knowl. Data Eng., Vol. 16, No. 10, October 2004.
19. Y. LeCun, F.-J. Huang, and L. Bottou, Learning Methods for Generic Object Recognition with Invariance to Pose and Lighting, CVPR 2004.
20. V. Lepetit and P. Fua, Monocular Model-Based 3D Tracking of Rigid Objects: A Survey, Foundations and Trends in Computer Graphics and Vision, Vol. 1, Nr. 1, pp. 1-89, October 2005.
21. Lowe, David. Distinctive Image Features from Scale-Invariant Keypoints. International Journal of Computer Vision, (60), 2004, 91-110, 2004.
22. D. Martin, C. Fowlkes, J. Malik. Learning to Detect Natural Image Boundaries Using Local Brightness, Color and Texture Cues, TPAMI 26 (5). 2004.
23. S. Medasani, R. Krishnapuram and Y. S. Choi, Graph matching by relaxation of fuzzy assignments, IEEE Trans. Fuzzy Systems, Vol. 9, No. 1, February 2001.
24. P. F. Muir and C. P. Neuman, Kinematic modeling of wheeled mobile robots, J. of Robotic Systems, vol. 4, no. 2, pp. 281-340, 1987.
25. Osada, Funkhouser, Chazelle and Dobkin, Matching 3D Models with shape distributions, Shape Modeling International, May 2001.
26, Y. Owechko, S. Medasani, and N, Srinivasa, Classifier Swarms for Human Detection in Infrared Imagery, IEEE Conference on Computer Vision and Pattern Recognition, Washington, D.C., 2004.
27. Kari Pulli and Linda Shapiro. Triplet-Based Object Recognition Using Synthetic and Real Probability Models. International Conference on Pattern Recognition (ICPR), Wien, Austria, August 1996.
28. Lawrence R. Rabiner. A tutorial on Hidden Markov Models and selected applications in speech recognition. Proceedings of the IEEE 77(2): 257-286. February, 1989.
29, Rusinkiewicz, S. and Levoy, M. Efficient variant of the ICP algorithm. Proceedings of 3-D Digital imaging and Modelling (3DIM), 2001.
30, Ashutosh Saxena, Justin Driemever, Andrew Y. Ng. International Journal of Robotics Research (IJRR), vol. 27, no. 2, pp. 157-173, February 2008.
31. T. Serre, L. Wolf and T. Poggio, Object Recognition with Features Inspired by Visual Cortex. CVPR 2005.
32. J. A. Sethian, Fast Marching Methods, SIAM Review, Vol. 41, No. 2, pp 199-235, 1999.
33. L. Shapiro and R. M. Haralick, A Metric for Comparing Relational Descriptions, IEEE Trans. Pattern Analysis and Machine Intelligence, vol. 7, pp. 90-94, 1985.
34, Shelton, C. R.: Morphable surface models. Int. J. Comput. Vision 38. 1 (2000), 75-91.
35. Jianbo Shi and Jitendra Malik. Normalized Cuts and Image Segmentation. IEEE Transactions on Pattern Analysis and Machine Intelligence. 1997. Vol. 27, 888-905.
36. W. Sorensen and H. Cline, Marching Cubes: A High Resolution Surface Reconstruction Algorithm, Computer Graphics 21(4) (SIGGRAPH Proceedings, 1987), July 1987, pp. 163-169.
37. Taubin, G. 1991. Estimation of Planar Curves, Surfaces, and Nonplanar Space Curves Defined by implicit Equations with Applications to Edge and Range Image Segmentation, IEEE Trans. Pattern Anal, Mach, Intell. 13, 11, pp. 1115-1.138, November 1991.
38. A versatile Camera calibration Technique for High-Accuracy 3D Machine Vision Metrology Using Off-the-Shelf TV Cameras and Lenses, Roger Y. Tsai, IEEE Journal of Robotics and Automation, Vol. RA-3, No. 4, pages 323-344, August 1987.
39. H. Zhang, A. Berg, M. Maire, and J. Malik, SVM-KNN: Discriminative Nearest Neighbor Classification for Visual Category Recognition, in CVPR. 2006.
40. H. Zhang, A. Sheffer, D. Cohen-Or, Q. Zhou, O. van Kaick, and A. Tagliasacchi, Deformation Driven Shape correspondence, Eurographics Symposium on Geometry Processing, Vol. 27, No. 5, 2008.
41. Srinivasa, N., Bhattacharyya, R., Sundareswara, R., Lee, C., and S. Grossberg. A bio-inspired kinematic controller for obstacle avoidance during reaching tasks with real robots. Neural Networks, 35: 54-69, 2012,
42. Ankerst, M., Kastenmuller, G., Kriegel, H. P., Seidl. T. 3D shape histograms for similarity search and classification in spatial databases. In: Proc. SSD, 1999.
43. Loh, W-Y. Classification and regression trees. Data mining and knowledge discovery, 1 (1), 2011, 14-23.
44. Bennett, Kristin P. and Campbell, Colin. *Support Vector Machines: Hype or Hallelujah?*, SIGKDD Explorations, 2, 2, 2000, 1-13.

45. Zhang, Zhengyou (1994). "Iterative point matching for registration of free-form curves and surfaces", *International Journal of Computer Vision* (Springer) 13 (12): 119-152.
46. Owechko, Yuri, Medasani, S, and Korah, Thommen, Automatic Recognition of Diverse 3-D Objects and Analysis of Large Urban Scenes Using Ground and Aerial LIDAR Sensors. Conference on Lasers and Electro-Optics, San Jose, Calif., May 16, 2010.

(2) PRINCIPAL ASPECTS

The present invention has three "principal" aspects. The first is a visual perception system for determining a position and pose of a three-dimensional object. The system is typically in the form of a computer system, computer component, or computer network operating software or in the form of a "hard-coded" instruction set. This system may take a variety of forms with a variety of hardware devices and may include computer networks, handheld computing devices, cellular networks, satellite networks, and other communication devices. As can be appreciated by one skilled in the art this system may be incorporated into a wide variety of devices that provide different functionalities. The second principal, aspect is a method for determining a position and pose of a three-dimensional object. The third principal aspect is a computer program product. The computer program product generally represents computer-readable instruction means (instructions) stored on a non-transitory computer-readable medium such as an optical storage device, e.g., a compact disc (CD) or digital versatile disc (DVD), or a magnetic storage device such as a floppy disk or magnetic tape. Other, non-limiting, examples of computer-readable media include hard disks, read-only memory (ROM), and flash-type memories.

The term "instructions" as used with respect to this invention generally indicates a set of operations to be performed on a computer, and may represent pieces of a whole program or individual, separable, software modules. Non-limiting examples of "instructions" include computer program code (source or object code) and "hard-coded" electronics (i.e. computer operations coded into a computer chip). The "instructions" may be stored on an non-transitory computer-readable medium such as a floppy disk, a CD-ROM, a flash drive, and in the memory of a computer.

(3) SPECIFIC DETAILS

The present invention enables visual perceptual capabilities for a robotic system. As can be appreciated by one skilled in the art, the invention described herein is suitable for any application that has a need for a robotic visual perception system. The invention is suitable for, but not limited to, applications where teleoperation is too tedious and quick adjustments to local surroundings are required. For example, robots could be employed in the field to retrieve a tool. Additionally, space exploration is a non-limiting example of an area to which this invention can be applied.

The present invention describes a robotic visual perception system to rapidly and reliably determine the position and pose of 3D objects, even in the presence of partial occlusions. The system also automatically identifies grasp and contact points (referred to as action points) for novel objects through matching flexible object templates. This system opens the door to a large number of diverse autonomous grasping and mobile manipulation applications that are not possible with current robotic systems.

The visual, perception, system described herein comprises a modular, but consistent, system design with increasingly complex core competencies. FIG. 1 is a flow diagram illustrating the process flow of the visual perception system. Input to a perception module 100 comes from a human guidance module 102, and from at least one sensed object 104 (obtained by, for instance, a camera) in the form of shape (i.e., three-dimensional) and visual appearance input 106. The human guidance module 102 allows a user to choose an object 101 for handling (i.e., grasping or manipulation). Output from the perception module 100 informs a robot controller 108 where to act on the sensed object 104. Additionally, the human guidance module 102 loads flexible object templates 110, from which rotation-invariant features 112 are extracted.

Shape input 106 first passes a scene segmentation submodule 114 from which rotation-invariant features 116 are extracted for the sensed objects 104. A match 118 between the rotation-invariant features 112 from a library of object templates 110 and the rotation-invariant features 116 from the sensed objects 104 determines the identity and three-dimensional pose of an object of interest. This match is further confirmed through visual appearance features 120 by combining probability distributions from shape and appearance based matching. Probability distributions are derived by normalizing classifier outputs for all classes to sum to 1. A non-limiting example would be a weighted average. These weights can be equal or inversely proportional to the variance in each probability distribution. This process is derived from Literature Reference No. 41. If the combined probability distribution does not confirm the original probability distribution, no match is reported. Mapping action points from a winning object template to the sensed objects 104 also defines position, pose, and action points 122 for the robot controller 108 to be used for robotic grasping or manipulation.

(3.1) Grasping and Manipulation of Known Rigid Objects

As a non-limiting example, the visual perception system identifies a desired object among other objects on a table and finds the location of action points on the objects. Beginning with the human guidance module (e.g., the instruction is "pick up the screwdriver"), the method of the visual perception system described herein comprises the following steps: scene segmentation to extract object candidates (FIG. 1, represented by reference element 114), computation of appearance and shape features (FIG. 1, represented by reference elements 106 and 116), matching of features with templates in an object template database (FIG. 1, represented by reference elements 118 and 112), further confirming this match through visual appearance features (FIG. 1, represented by reference element 120) and mapping of action points from object templates to real-world objects (FIG. 1. represented by reference element 122).

For scene segmentation, protrusions given three-dimensional (3D) input data from a sensor) are detected by computing the distribution of 3D points in vertical columns arranged in a two-dimensional (2D) array. Non-limiting examples of sensors include a Swiss Ranger 4000 3D camera and a Bumblebee 2 camera. Based on changes in distribution between neighboring columns, object boundaries are identified (Literature Reference No. 17) and object candidates are obtained.

Figure 2:
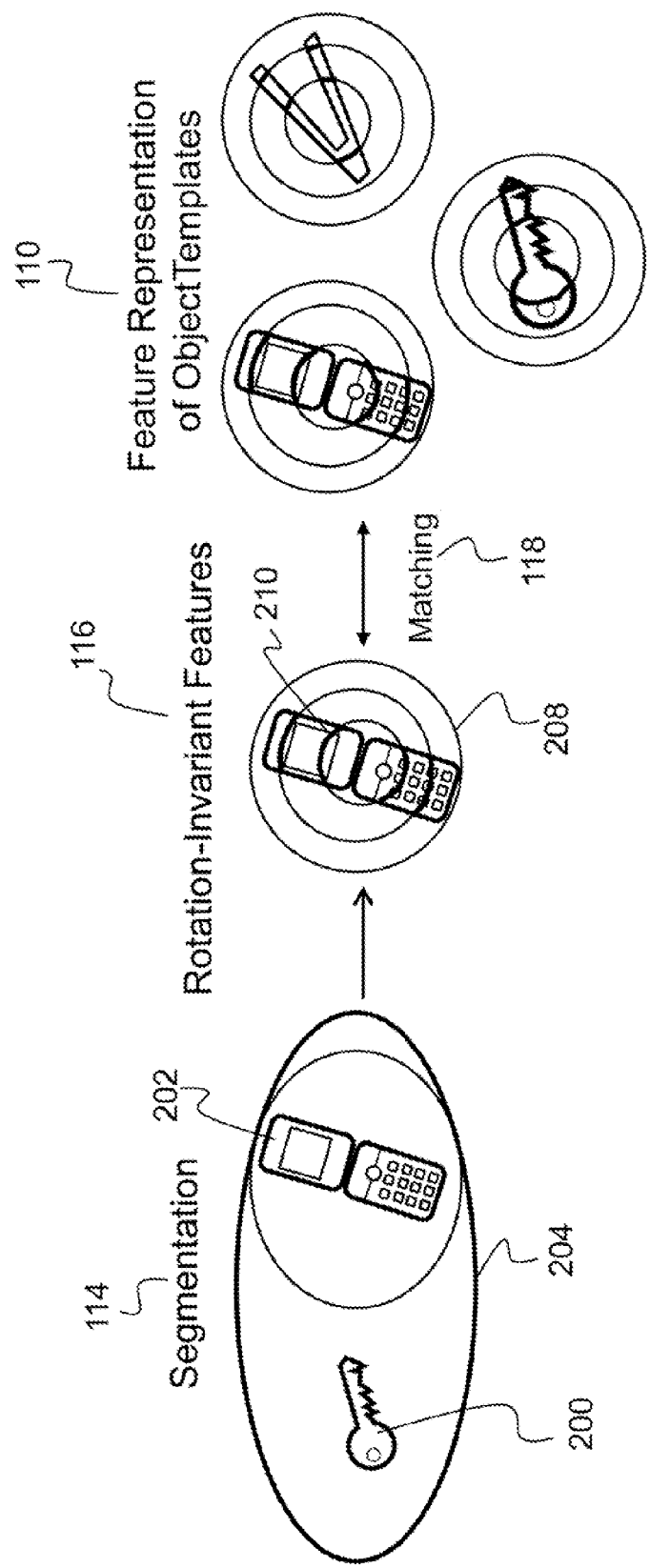
FIG. 2 illustrates real-world objects segmented from a scene and matched to object templates using rotation-invariant features according to the present invention.

Since objects can appear in any orientation, rotation-invariant shape features are computed. In a desired aspect, the present invention utilizes the method employed by Literature Reference No. 46, which shows tremendous speed and robust object-class identification. This system is related to the 3D shape histogram work of Literature Reference No. 42. FIG. 2 illustrates real-world objects, such as a key 200 and a mobile phone 202, from a scene (e.g., table 204) matched to object templates 110 using rotation-invariant features 116. As shown in FIG. 2, following scene segmentation 114, an object (e.g., mobile phone 202) is selected. Around the center of the object. (e.g., mobile phone 202) a nested sequence of spheres 208 is constructed. For each sphere, the number of intersections 210 with the object (as indicated by a darkened section of a sphere) is computed. Similarly, the area of these intersections relative to the area of the spheres is another feature that can be extracted. Spheres are described as a non-limiting example of shapes that could be used. As can be appreciated by those skilled in the art, other shapes could also be used, such as cuboids. The histogram of intersections across spheres is a rotation-invariant feature 116 and can also be combined with the area information to form a feature vector suitable for matching through various machine learning techniques. The rotation-invariant features 116 extracted from the mobile phone 202 then undergo matching 118 with a set of object templates 110, as described above. Additionally, to improve center-of-object detection, a movable head of a robot can be used to obtain multiple views of the object.

A purely shape-based method may show poor discrimination between similarly shaped objects, like a knife and a screwdriver. Therefore, in the present invention, the shape features are augmented with appearance features. Local feature-detection algorithms (LFA) are used to find features of interest in the images. A commonality among LFAs is that they compute a histogram of intensity information from local image gradients that have been determined to be scale-space and orientation invariant. Non-limiting examples of LFAs are Scale Invariant Feature Transform (SIFT) (see Literature Reference No. 21) and Speeded-Up Robust Features (SURF) (see Literature Reference No. 1). In a desired aspect, on a 2D image input (e.g., 5 MP color camera), SURF are computed, which have been shown to be more robust and faster than the related and widely used SIFT. However, as can be appreciated by one skilled in the art, any suitable local feature descriptor could be utilized.

For object identification, a matching process with known object templates in a database (e.g. 3D computer—aided design (CAD) models) is used. As described above, shape and appearance features on the object templates are computed. Appearance features are obtained from real-world training objects presented in various poses. For matching, a hierarchical process is utilized, where objects are first filtered based on shape, and then on appearance as described by Literature Reference No. 41. Filtering based on shape would compare rotation-invariant features from sensed objects with features from trained objects using any number of machine learning techniques, such as classification and regression tree (CART) (see Literature Reference No. 43) or support vector machine (SVM) (see Literature Reference No. 44). After candidate objects have been identified by shape, each trained object model would be aligned with a sensed object (this alignment is described below). As each shape model has associated appearance information (e.g., SURF points on the top, bottom or sides of an object), expected appearance features from a matched viewpoint can also be matched with the sensed objects to further filter the sensed object. Matching, based on appearance can be done by counting the number of matching appearance features, pruning this list through robust statistical methods (Literature Ref. No. 8). An appearance feature is said to be matched when the distance between sensed and trained feature is within some tolerance. The shape-based match is further confirmed through visual appearance features by combining probability distributions from shape and appearance based matching as described by Literature Reference No. 41. This additional step disambiguates objects that are similarly shaped but look different (e.g., a knife and a screwdriver). The search is limited, since one either compares one object template with all observed objects or one observed object with all object templates (i.e., the instruction is "grasp the object in front of you").

All object templates are augmented with action points, which represent places to grasp or manipulate, during preparation. After finding a matching object template, these action points are transformed into real-world coordinates. To find the required rotation and translation parameters, a variant of the Iterative Closest Point (ICP) method is used (see Literature Reference No. 30), which aligns point clouds and provides position, pose, and action points to a robot controller.

In a desired aspect, the identified action points may be tracked in a robotic manipulation task. This step does not require template matching, but only a few ICP steps (order of 10 milliseconds (see Literature Reference No. 29)) to compute a transformation matrix. ICP returns a transformation matrix by associating points, estimating transformation parameters (such as rotation and translation using a cost function), transforming the points using the estimated parameters, followed by iteration (re-associate the points and so on) until some threshold criteria for the cost function has been reached. Because the object has already been identified and its pose approximated, ICP does not need many iterations. This algorithm can also handle occlusions which may occur after the robot grasps the object (see Literature Reference No. 45). To achieve a high-speed control loop (100 to 1000 Hertz (Hz)) that exceeds vision-computation speeds, visual feedback is provided at a lower rate (20 Hz), and the forward kinematics is used to fill in the gap. Forward kinematics uses known joint angles and limb lengths to directly compute where the object is in the robot's grasp. As these computations are simple geometry, they can be done very quickly.

(3.2) Grasping and Manipulation of Partially Known Articulated and Partially Occluded Objects Furthermore, the competencies presented above were extended to objects similar (but not necessarily identical) to training templates, articulated objects, as well as objects that are partially occluded. As depicted in FIGS. 3A-3C, to grasp articulated objects, a non-limiting example of which includes a pair of pliers 300, the approach was broadened from rigid whole object templates to templates of object parts 302, as shown in FIG. 3A The templates of object parts 302 use the same feature representation as described above (including shape and appearance), and the rotation-invariant features persist for matching 304. Objects are defined as combinations of certain key parts, such as a head and handles of a pair of pliers. The key parts are identified through combinatorial search; thus, the matching process depicted in FIGS. 1 and 2 is updated. An example of this search would be matching an observed, head of a pair of pliers with trained heads of pliers or screwdrivers or hammers. Similarly, handles could be matched. This approach also extends to matching between similar objects of the same class. For example, a screwdriver is identified by its head and handle, so that the matching is invariant about the length of the shaft.

Many objects, such as pliers and screwdrivers, have parts in a specific location relative to each other. For those object types, their structures are exploited to speed up object identification and improve accuracy. As shown in FIG. 3B, a graph is built (see Literature Reference No. 18) where nodes 306 represent object parts (e.g., head and handles), and edges 308 represent spatial relations. Each edge 308 has a variable length and orientation to account for articulation and variation within an object class, such as change in orientation and changes in spatial relations between object parts, as depicted in FIG. 3C. To find a match 304 between a known (FIG. 3B) and an observed object (FIG. 3C), a combination of graph (see Literature Reference No. 23) and piece-wise rigid-body mapping (see Literature Reference No. 29) is used.

Part-based identification naturally extends to partial occlusions; missing parts are removed from the cost function in the optimization of finding a match. As an example, if one is trying to match a pair of pliers, but one of the handles is occluded, this node and associated edges would be deleted in the object template and the optimization would continue. Another method of handling occlusions is detailed in Literature Reference No. 18; there the introduction of dummy nodes compensates for occlusions. To compute action points, action points are assigned to each object-part template and transformed into Cartesian space using each object part's identified location and pose. ICP provides the pose of each object-pan so one can translate trained action points onto observed object-parts. If a critical grasp point (e.g., one handle of a pair of pliers) falls on a hidden part, one can use one robot hand to push away the occluding object. This object is identified from a protrusion in the line of sight to the object to be grasped.

(3.3) Experimental Results

Experimental tests of the present invention demonstrated the feasibility of computing grasp points of known objects using the approach detailed above. The method can be utilized compute grasp areas in spite of noisy shape and appearance data, with or without CAD models, and for any viewpoint and position of the robot. These grasp areas are computed from images (and their associated depth maps) of the objects in a cluttered, realistic environment.

Figure 4A:
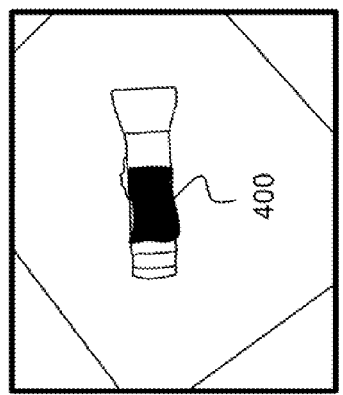
FIG. 4A illustrates a training view of a flashlight with manually marked grasping areas according to the present invention.
Figure 4B:
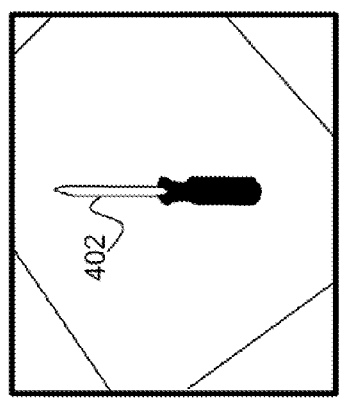
FIG. 4B illustrates a training view of a screwdriver with manually marked grasping areas according to the present invention.
Figure 4C:
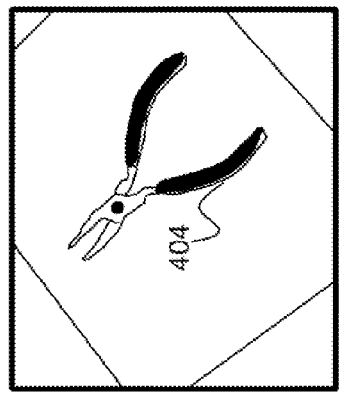
FIG. 4C illustrates a training view of a pair of pliers with manually marked grasping areas according to the present invention.
Figure 4D:
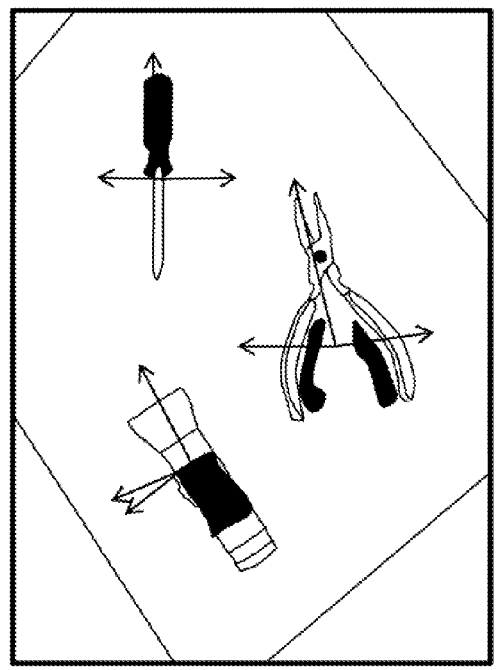
FIG. 4D illustrates computed grasping and object-centered coordinate axes for the flashlight, screwdriver, and the pair of pliers according to the present invention.

For image and depth map acquisition, a stereovision system (a non-limiting example of which includes a Tyzx, 6 cm baseline, 312×500 pixels) was utilized. This represents shape and visual appearance input (FIG. 1, reference element 106). FIGS. 4A-4D illustrate grasp points that are correctly identified on known objects in novel positions and poses, despite the presence of other objects and background features. As preparation, grasping areas in training images of object templates were manually marked. FIGS. 4A-4C depict training views of three objects (a flashlight 400, a screwdriver 402, and a pair of pliers 404) and their manually marked grasping areas (shown in black). In FIG. 4D, computed grasping areas are indicated in black, and object-centered coordinate axes are represented by arrows.

During the experiment, for every identified segment (i.e., protrusion), object matching was first performed using shape features to identity the corresponding object template through rotation-invariant features and matching. Second, the transformation between object template and test object was computed using ICP. This match was confirmed through appearance features (e.g. SURF features). Finally, given the computed transformation, object-centered coordinate systems and the location of grasp areas in world-centered coordinates were computed, as shown in FIG. 4D, which correspond to position, pose, and action points (FIG. 1, reference element 122) to the robot controller (FIG. 1, reference element 108).

Figure 5:
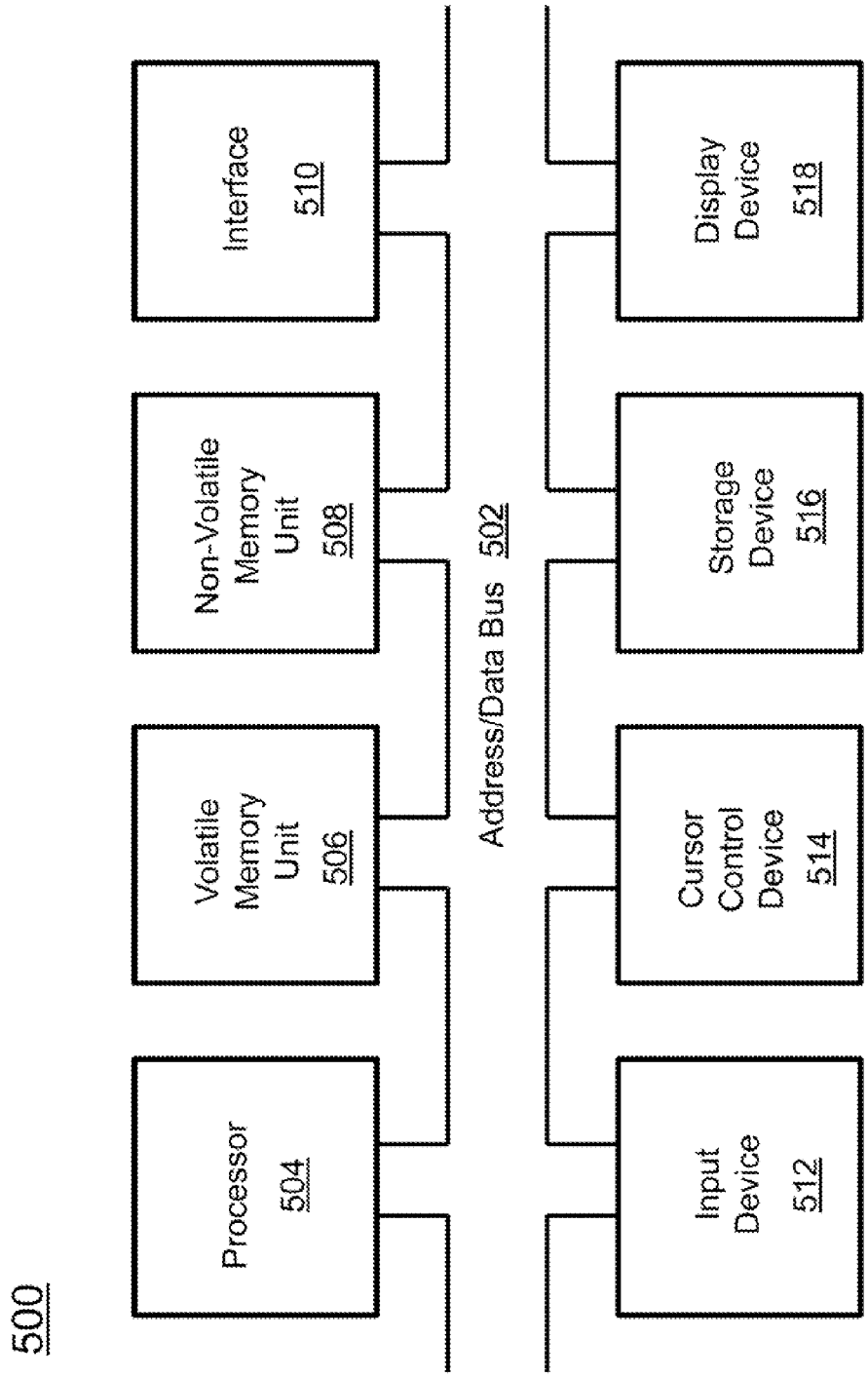
FIG. 5 is an illustration of a data processing system according to the present invention.

An example of a computer system 500 in accordance with one aspect is shown in FIG. 5. The computer system 500 is configured to perform calculations, processes, operations, and/or functions associated with a program or algorithm. In one aspect, certain processes and steps discussed herein are realized as a series of instructions (e.g., software program) that reside within computer readable memory units and are executed by one or more processors of the computer system 500. When executed, the instructions cause the computer system 500 to perform specific actions and exhibit specific behavior, such as described herein.

The computer system 500 may include an address/data bus 502 that is configured to communicate information. Additionally, one or more data processing units, such as a processor 504, are coupled with the address/data bus 502. The processor 504 is configured to process information and instructions. In one aspect, the processor 504 is a microprocessor. Alternatively, the processor 504 may be a different type of processor such as a parallel processor, or a field programmable gate array.

The computer system 500 is configured to utilize one or more data storage units. The computer system 500 may include a volatile memory unit 506 (e.g., random access memory ("RAM"), static RAM, dynamic RAM, etc.) coupled with the address/data bus 502, wherein a volatile memory unit 506 is configured to store information and instructions for the processor 504. The computer system 600 further may include a non-volatile memory unit 508 (e.g., read-only memory ("ROM"), programmable ROM ("PROM"), erasable programmable ROM ("EPROM"), electrically erasable programmable ROM "EEPROM"), flash memory, etc.) coupled with the address/data bus 502, wherein the non-volatile memory unit 508 is configured to store static information and instructions for the processor 504. Alternatively, the computer system 500 may execute instructions retrieved from an online data storage unit such as in "Cloud" computing. In one aspect, the computer system 500 also may include one or more interfaces, such as an interface 510, coupled with the address/data bus 502. The one or more interfaces are configured to enable the computer system 500 to interface with other electronic devices and computer systems. The communication interfaces implemented by the one or more interfaces may include wireline serial cables, modems, network adaptors, etc.) and/or wireless (e.g., wireless modems, wireless network adaptors, etc.) communication technology.

In one aspect, the computer system 500 may include an input device 512 coupled with the address/data bus 502, wherein the input device 512 is configured to communicate information and command selections to the processor 500. In accordance with one aspect, the input device 512 is an alphanumeric input device, such as a keyboard, that may include alphanumeric and/or function keys. Alternatively, the input device 512 may be an input device other than an alphanumeric, input device. In one aspect, the computer system 500 may include a cursor control device 514 coupled with the address/data bus 502, wherein the cursor control device 514 is configured to communicate user input information and/or command selections to the processor 500. In one aspect, the cursor control device 514 is implemented using a device such as a mouse, a track-ball, a track-pad, an optical tracking device, or a touch screen. The foregoing notwithstanding, in one aspect, the cursor control device 514 is directed and/or activated via input from the input device 512, such as in response to the use of special keys and key sequence commands associated with the input device 512 in an alternative aspect, the cursor control device 514 is configured to be directed or guided by voice commands.

In one aspect, the computer system 500 further may include one or more optional computer usable data storage devices, such as a storage device 516, coupled with the address/data bus 502. The storage device 516 is configured to store information and/or computer executable instructions. In one aspect, the storage device 516 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 518 is coupled with the address/data bus 502, wherein the display device 518 is configured to display video and/or graphics. In one aspect, the display device 518 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 500 presented herein is an example computing environment in accordance with one aspect. However, the non-limiting example of the computer system 500 is not strictly limited to being a computer system. For example, one aspect provides that the computer system 500 represents a type of data processing analysis that may be used in accordance with various aspects described herein. Moreover, other computing systems may also be implemented. Indeed, the spirit and scope of the present technology is not limited to any single data processing environment. Thus, in one aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, one aspect provides that one or more aspects of the present technology are implemented by utilizing one or more distributed computing environments, such as where tasks are performed by remote processing devices that are linked through a communications network, or such as where various program modules are located in both local and remote computer-storage media including memory-store devices.

Figure 6:
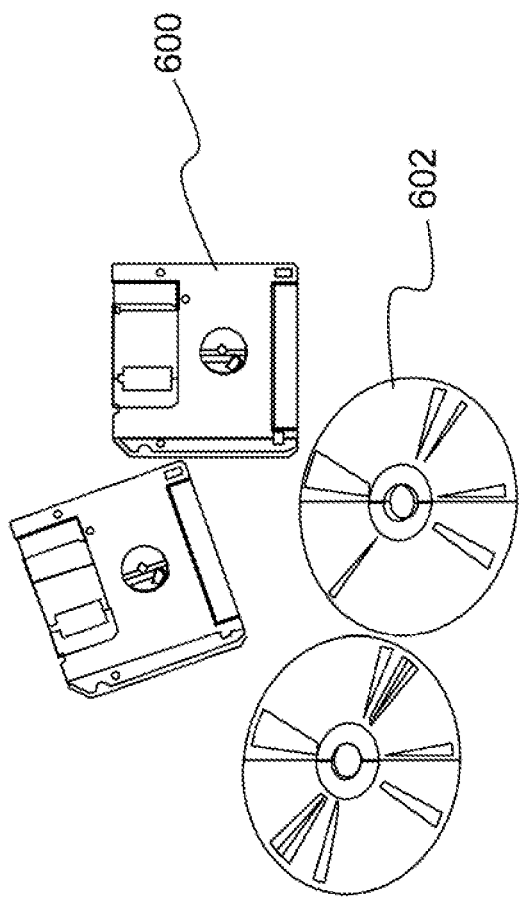
FIG. 6 is an illustration of a computer program product according to the present invention.

An illustrative diagram of a computer program product embodying the present invention is depicted in FIG. 6. As a non-limiting example, the computer program product is depicted as either a floppy disk 600 or an optical disk 602. However, as mentioned previously, the computer program product generally represents computer readable code (i.e., instruction means or instructions) stored on any compatible non-transitory computer readable medium.

What is claimed is:

1. A visual perception system for determining a position and pose of a three-dimensional object, the system comprising:
one or more processors and a memory having instructions such that when the instructions are executed, the one or more processors perform operations of:
receiving visual input from a sensor of a robotic controller that senses an object of interest;
extracting a plurality of rotation-invariant shape features from the sensed object of interest;
extracting a plurality of rotation-invariant shape features from a set of object templates;
identifying a match between the sensed object of interest and an object template using shape features;
confirming the match between the sensed object of interest and the object template using appearance features;
identifying the sensed object of interest and determining a three-dimensional pose of the sensed object of interest; and
using the robotic controller to handle the sensed object of interest based on the determined three-dimensional pose of sensed object of interest.

2. The system as set forth in claim 1, wherein the one of more processors further perform operations of:
augmenting, the set of object templates with a set of action points, wherein the action points represent at least a portion of the sensed object that can be handled by the robotic controller; and
after identifying the match, transforming the set of action points into a set of real-world coordinates to guide the robotic controller in handling the sensed object.

3. The system as set forth in claim 2, wherein the one of more processors further perform operations of:
determining a center of the sensed object of interest;
constructing a nested sequence of shapes around the center of the sensed object of interest;
computing intersection data related to intersections between the sensed object of interest and the nested sequence of shapes; and
computing the plurality of rotation-invariant features from the sensed object based on the intersection data.

4. The system as set forth in claim 3, wherein the one or more processors further perform operations of:
computing appearance features from the set of object templates, wherein the appearance features are obtained from real-world training objects presented in various poses; and
computing appearance features from the sensed object of interest, wherein the appearance features from the sensed object of interest comprise local feature descriptors.

5. The system as set forth in claim 4, wherein the one or more processors further perform an operation of using the plurality of rotation-invariant shape features and appearance features from the sensed object of interest and the plurality of rotation-invariant shape features and appearance features from the set of object templates to determine a match between the object of interest and an object template.

6. The system as set forth in claim 1, wherein the one or more processors further perform operations of:
constructing a graph representing the sensed object of interest, wherein the sensed object of interest comprises a plurality of object parts;
wherein the set of object templates is a set of templates of object parts;
wherein the graph comprises a plurality of nodes and edges connecting the plurality of nodes, wherein each node represents an object part of the sensed object of interest and each edge represents a spatial relation between at least two object parts of the sensed object of interest; and
matching the plurality of object parts with the set of templates of object parts.

7. A computer-implemented method for determining a position and pose of a three-dimensional object, comprising:
an act of causing a data processor to execute instructions stored on a non-transitory memory such that upon execution, the data processor performs operations of:
receiving visual input from a sensor of a robotic controller that senses an object of interest;
extracting a plurality of rotation-invariant shape features from the sensed object of interest;
extracting, a plurality of rotation-invariant shape features from a set of object templates using shape features;
identifying a match between the sensed object of interest and an object template;
confirming the match between the sensed object of interest and the object template using appearance features;
identifying the sensed object of interest and determining a three-dimensional pose of the sensed object of interest; and using the robotic controller to handle the sensed object of interest based on the determined three-dimensional pose of the sensed object of interest.

8. The method as set forth in claim 7, further comprising an act of causing the data processor to perform operations of:
augmenting the set of object templates with a set of action points, wherein the action points represent at least a portion of the sensed object that can be handled by the robotic controller; and
after identifying the match, transforming the set of action points into a set of real-world coordinates to guide the robotic controller in handling the sensed object.

9. The method as set forth in claim 8, further comprising an act of causing the data processor to perform operations of:
determining a center of the sensed object of interest;
constructing a nested sequence of shapes around the center of the sensed object of interest;
computing intersection data related to intersections between the sensed object of interest and the nested sequence of shapes; and
computing the plurality of rotation-invariant features from the sensed object based on the intersection data.

10. The method as set forth in claim 9, further comprising an act of causing a data processor to perform operations of:
computing appearance features from the set of object templates, wherein the appearance features are obtained from real-world training objects presented in various poses; and
computing appearance features from the sensed object of interest, wherein the appearance features from the sensed object of interest comprise local feature descriptors.

11. The method as set forth in claim 10, further comprising an act of causing the data processor to perform an operation of using, the plurality of rotation-invariant shape features and appearance features from the sensed object of interest and the plurality of rotation-invariant shape features and appearance features from the set of object templates to determine a match between the object of interest and an object template.

12. The method as set forth in claim 7, further comprising an act of causing the data processor to perform operations of:
constructing a graph representing the sensed object of interest, wherein the sensed object of interest comprises a plurality of object parts;
wherein the set of object templates is a set of templates of object parts;
wherein the graph comprises a plurality anodes and edges connecting the plurality of nodes, wherein each node represents an object part of the sensed object of interest and each edge represents a spatial relation between at least two object parts of the sensed object of interest; and
matching the plurality of object parts with the set of templates of object pans.

13. A computer program product for determining a position and pose of a three-dimensional object, the computer program product comprising computer-readable instructions stored on a non-transitory computer-readable medium that are executable by a computer having a processor for causing the processor to perform operations of:
receiving visual input from a sensor of a robotic controller that senses an object of interest;
extracting a plurality of rotation-invariant shape features from the sensed object of interest;
extracting, a plurality of rotation-invariant shape features from a set of object templates using shape features;
identifying a match between the sensed object of interest and an object template;
confirming the match between the sensed object of interest and the object template using appearance features;
identifying the sensed object of interest and determining a three-dimensional pose of the sensed object of interest; and
using the robotic controller to handle the sensed object of interest based on the determined three-dimensional pose of the sensed object of interest.

14. The computer program product as set forth in claim 13, further comprising instructions for causing the processor to perform operations of:
augmenting the set of object templates with a set of action points, wherein the action points represent at least a portion of the sensed object that can be handled by the robotic controller; and
after identifying the match, transforming the set of action points into a set of real-world coordinates to guide the robotic controller in handling the sensed object.

15. The computer program product as set forth in claim 14, further comprising instructions for causing the processor to perform operations of:
determining a center of the sensed object of interest;
constructing a nested sequence of shapes around the center of the sensed object of interest;
computing intersection data related to intersections between the sensed object of interest and the nested sequence of shapes; and
computing the plurality of rotation-invariant features from the sensed object based on the intersection data.

16. The computer program product as set forth in claim 15, further comprising instructions for causing the processor to perform operations of:
computing appearance features from the set of object templates, wherein the appearance features are obtained from real-world training objects presented in various poses; and
computing appearance features from the sensed object of interest, wherein the appearance features from the sensed object of interest comprise local feature descriptors.

17. The computer program product as set forth in claim 16, further comprising instructions for causing the processor to perform an operation of using the plurality of rotation-invariant shape features and appearance features from the sensed object of interest and the plurality of rotation-invariant shape features and appearance features from the set of object templates to determine a match between the object of interest and an object template.

18. The computer program product as set forth in claim 13, further comprising instructions for causing the processor to perform operations of:
constructing a graph representing the sensed object of interest, wherein the sensed object of interest comprises a plurality of object parts;
wherein the set of object templates is a set of templates of object parts;
wherein the graph comprises a plurality of nodes and edges connecting the plurality of nodes, wherein each node represents an object part of the sensed object of interest and each edge represents a spatial relation between at least two object parts of the sensed object of interest; and
matching the plurality of object parts with the set of templates of object parts.

* * * * *